(12) United States Patent
Melhem et al.

(10) Patent No.: US 7,853,938 B2
(45) Date of Patent: Dec. 14, 2010

(54) CREATING MULTIPLE AND CASCADING BUSINESS INTERPRETATIONS FROM RAW APPLICATION DATA USING TRANSFORMATION LAYERING

(75) Inventors: Wassim Melhem, Toronto (CA); Christine N. Knight, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1446 days.

(21) Appl. No.: 10/650,905

(22) Filed: Aug. 28, 2003

(65) Prior Publication Data

US 2004/0078760 A1 Apr. 22, 2004

(30) Foreign Application Priority Data

Oct. 21, 2002 (CA) .................... 2409079

(51) Int. Cl.
*G06F 9/45* (2006.01)

(52) U.S. Cl. .................... 717/152

(58) Field of Classification Search ......... 717/101–116, 717/118, 136–139, 148, 152; 709/315, 217; 707/101, 3, 530, 107; 705/40, 37; 715/728
See application file for complete search history.

(56) References Cited

U.S. PATENT DOCUMENTS

| | | | | |
|---|---|---|---|---|
| 6,336,124 | B1 | 1/2002 | Alam et al. ................. 707/523 |
| 6,654,734 | B1 | 11/2003 | Mani et al. ...................... 707/2 |
| 6,708,186 | B1 * | 3/2004 | Claborn et al. ............... 707/107 |
| 6,772,408 | B1 * | 8/2004 | Velonis et al. ............... 717/106 |
| 6,847,974 | B2 * | 1/2005 | Wachtel ....................... 707/101 |
| 7,013,329 | B1 * | 3/2006 | Paul et al. .................... 709/217 |
| 7,058,890 | B2 * | 6/2006 | George et al. ............... 715/728 |
| 7,111,206 | B1 * | 9/2006 | Shafer et al. .................. 714/48 |
| 7,149,694 | B1 * | 12/2006 | Harb et al. ................ 704/270.1 |
| 2001/0018696 | A1 | 8/2001 | Hori et al. |
| 2001/0039540 | A1 * | 11/2001 | Hofmann et al. |
| 2001/0049702 | A1 * | 12/2001 | Najmi |
| 2001/0056460 | A1 * | 12/2001 | Sahota et al. |
| 2002/0059204 | A1 * | 5/2002 | Harris ........................... 707/3 |
| 2002/0184401 | A1 * | 12/2002 | Kadel et al. ................. 709/315 |
| 2003/0014447 | A1 * | 1/2003 | White ......................... 707/530 |
| 2003/0033240 | A1 * | 2/2003 | Balson et al. ................. 705/37 |
| 2003/0058469 | A1 | 3/2003 | Buis et al. |

(Continued)

FOREIGN PATENT DOCUMENTS

WO WO 00/56033 A1 9/2000

(Continued)

OTHER PUBLICATIONS

Bruning, Oliver, "X4Dialog: Help for Dynamic Web Sites", Java Report, vol. 6, No. 5, May 2001; pp. 1-7.*

(Continued)

*Primary Examiner*—Tuan Anh Vu
(74) *Attorney, Agent, or Firm*—Yee & Associates, P.C.; David A. Mims, Jr.

(57) ABSTRACT

An XSLT-based transformation process addresses the performance problems of ordinary XSLT transformations and provides for an efficient conversion of many sources of raw, or interpreted, application data into many different interpretations. In addition, the data may be filtered to downstream users, thus enabling the use of security measures by way of the filters.

17 Claims, 10 Drawing Sheets

U.S. PATENT DOCUMENTS

2004/0177039 A1* 9/2004 Pincus et al. .................. 705/40

FOREIGN PATENT DOCUMENTS

| WO | WO 00/73941 A2 | 12/2000 |
| WO | WO 01/67289 A2 | 9/2001 |

OTHER PUBLICATIONS

Oracle8i, "Oracle8i/Application Developer's Guide-XML, Release 3(8.1.7)", copyright 1996-2000, Oracle Corporation, pp. 1-8 (Adx_Transviewer.pdf).*

*Internet-Based Medical Teleconsultation System*, by Peck et al., University of Zagreb, Croatia.

*Formsheets and the XML Forms Language*, by Kristensen, HP Labs, Bristol, U.K.

*Shared XML Documents in Service Centers of the Future*, by Sshmidt et al.

*SERFing the Web: The Re-Web Approach for Web Re-Structuring*, by Chen et al., Department of Computer Science, Worcester Polytechnic Institute, Worcester, Mas., World Wide Web, vol. 3, No. 2, 2000 pp. 95-109, 2000.

*Design and Application of XTML Script Language Based on XML*, by Chung et al., Journal of Kiss(C), Computing Practices, vol. 5, No. 6 pp. 816-833, 2000.

*System for Paginating Markup in the Absence of Direct Fed Back From an Output Device Context*, disclosed by IBM, Research Disclosure 450098, p. 1728, Oct. 2001.

*Generating Java Code From XML Schema With an XSL Stylesheet* disclosed by IBM, Research Disclosure 446153, pp. 1036-1037, Jun. 2001.

*XML Based System for Updating a Domain Model and Generating a Formatted Output*, U.S. Appl. No. 09/644,819, filed Aug. 23, 2000.*

* cited by examiner

```
<?xml version="1.0"?>
<xsl:stylesheet xmlns:xsl="http://www.w3.org/1999/XSL/Transform"
                xmlns:java="http://xml.apache.org/xslt/java"
                exclude-result-prefixes="java"
                version="1.0">

<xsl:template match="/">
    <STACKCHART>
        <xsl:apply-templates select="//SHIPPED"/>
        <xsl:apply-templates select="//BACKORDERED"/>
        <XTITLE>Daily Inventory Summary</XTITLE>
        <XTITLE>Inventory Items</XTITLE>
        <YTITLE>100s of items</YTITLE>
        <TIMESTAMP>
            Last update: <xsl:value-of select="java:com.ibm.etools.dashboard.common.Utilities.getDate()"/>
        </TIMESTAMP>
        <LEGENDTITLE>Status</LEGENDTITLE>
    </STACKCHART>
</xsl:template>

<xsl:template match="SHIPPED">
    <BARSET item="Shipped">
        <xsl:apply-templates select="ITEM"/>
    </BARSET>
</xsl:template>

<xsl:template match="BACKORDERED">
    <BARSET item="Backordered">
        <xsl:apply-templates select="ITEM"/>
    </BARSET>
</xsl:template>

<xsl:template match="ITEM">
    <BAR label="{@type}"><xsl:value-of select="."/></BAR>
</xsl:template>

</xsl:stylesheet>
```

<u>FIG. 4</u>

```
/**
 * Constructor
 */
public DataProvider() {
    super();
} public DataProvider getDataSource() {
    return this.dataSource;
} public Document getDocument() {
    return getDocumentElement().getOwnerDocument();
}
```

FIG. 5B

```
/**
 *
 * returns the data provider as a stream of bytes
 *
 */
public byte[] getDocumentAsStream() {
    ByteArrayOutputStream stream = new ByteArrayOutputStream();
    try {
        (new XMLSerializer(stream, null)).serialize(this);
    } catch (Exception e) {
    }
    return stream.toByteArray();
}

/**
 *
 * returns the data provider as a string of characters
 *
 */
public string getDocumentAsString() {
    StringWriter writer = new StringWriter();
    try {
        (new XMLSerializer(writer, null)).serialize(this);
    } catch (Exception e) {
    }
    return writer.getBuffer().toString();
}
```

FIG. 5C

```
public String getStylesheet() {
    return stylesheet;
} public Transformer getTransformer() {
    return transformer;
} public void setDataSource(DataProvider dataSource) {
    this.dataSource = dataSource;
} public void setStylesheet(String name) {
    stylesheet = name;
}
```

FIG. 5D

```
/**
 * This method uses the stylesheet file name set by the user to create
 * a transformer object.
 */
public void setTransformer() {
    try {
        // create a transformer factory
        TransformerFactory tFactory = TransformerFactory.newInstance();

File file = new File(stylesheet);

if (file.exists()) {
            StreamSource stylesource = new StreamSource(file);

// Use a transformer that uses the stylesheet
            transformer = tFactory.newTransformer(stylesource);
        }

// if the xsl file name is null, or if the xsl file does not exist:
        // create a transformer that generates a copy of the source, unchanged.
        if (transformer == null) {
            transformer = tFactory.newTransformer();
        }
    } catch (Exception e) {
    }
}
```

FIG. 5E

```
/**
 * When update() is called, the data provider calls update() on its data
 * source.
 * It then performs a transformation with the dataSource's document as the
 * source and itself as the result.
 */
public void update() {
    try {
        // clear all elements in the data provider
        if (getDocumentElement() != null)
            this.removeChild(getDocumentElement());

// call update() on the data source and do the transformation
        if (dataSource != null) {
            dataSource.update();

if (dataSource.getDocument() != null) {
                DOMSource source = new DOMSource(dataSource.getDocument());
                DOMResult result = new DOMResult(this);
                transformer.transform(source, result);
            }
        }
        // merge all adjacent text nodes into one
        getDocumentElement().normalize();
    } catch (Exception e) {
    }
}
```

FIG.5F

CREATING MULTIPLE AND CASCADING BUSINESS INTERPRETATIONS FROM RAW APPLICATION DATA USING TRANSFORMATION LAYERING

FIELD OF THE INVENTION

The present invention relates to the creation of interpretations of raw application data. In particular, there may be multiple and cascading business interpretations and creation of these business interpretations makes use of transformation layering.

BACKGROUND OF THE INVENTION

Where once computers were employed to run specific applications, it is now commonplace for a general purpose computer to run several unrelated applications at the same time. Occasionally, there may be cause for one application to pass data to another application running on the same computer or, over a network connection, to another application running on a separate and distinct computer. Traditionally, such a data transfer required the data sending application to perform data conversion so that the data is encoded using a coding scheme that may be understood by the data receiving application.

The eXtensible Markup Language (XML) has, of late, become a standard coding scheme for such data transfers. An increasing amount of the data transferred between applications is encoded in XML. However, data conversion is still as important as ever, since different applications use different data models. The same data set can be represented in many different ways and different people have interest in different subsets of information. For example, business dashboards are applications which provide business views on specific data. Before a view of the data is presented to a user of a business dashboard, the data has to be gathered, interpreted, aggregated and filtered. In addition, security measures may dictate that different users have different authorizations on the data. Consequently, each view presented to an individual user should conform to such security measures.

The World Wide Web Consortium describes the eXtensible Stylesheet Language (XSL) as a language for expressing stylesheets. Where a "stylesheet", a term extended from print publishing to online media, is a definition of the appearance of a document. XSL consists of three parts. The first part is XSL Transformations (XSLT), a language for transforming XML documents described in a specification available at http://www.w3.org/TR/xslt20/that is hereby incorporated herein by reference. The second part is the XML Path Language (XPath), an expression language used by XSLT to access, or to refer to, parts of an XML document. The third part is XSL Formatting Objects, an XML vocabulary for specifying formatting semantics. An XSL stylesheet specifies the presentation of a class of XML documents by describing how an instance of the class is transformed into an XML document that uses the formatting vocabulary.

When it comes to converting one XML data set to another XML data set, XSLT is one choice. XSLT, however, has performance problems. During transformation, XSLT processors hold all the data in memory as a tree structure. This tree structure can require as much as ten times more memory than was required to store the original data. Such an increase in the memory required during conversion can limit the quantity of data for which an XSLT conversion may be performed. Even at a maximum size of three or four megabytes, a XSLT conversion can be quite time-consuming, depending on the type of processing that is required.

SUMMARY OF THE INVENTION

An XSL-based transformation process addresses previous performance problems and provides for an efficient conversion of many sources of raw, or interpreted, application data into many different interpretations. In addition, the data may be filtered to downstream users, thus enabling the use of security measures by way of the filters.

In accordance with an aspect of the present invention there is provided a computer readable medium containing computer-executable instructions which, when performed by a processor in a computer system, cause the computer system to process at least one original document of raw application data with a cascade of reusable platform-independent software components.

In accordance with another aspect of the present invention there is provided a computer system for data interpretation. The computer system includes a processor operable to perform computer-executable instructions to process at least one original document of raw application data with a cascade of reusable platform-independent software components.

In accordance with still another aspect of the present invention there is provided a method for processing at least one original document of raw application data. The method includes processing at least one original document of raw application data with a cascade of reusable platform-independent software components.

For each of the above aspects of the invention, each component of the cascade that receives an input from an other component of the cascade, receives an input document from the other component and applies an eXtensible Stylesheet Language stylesheet to at least the input document to produce an output document.

In accordance with a further aspect of the present invention there is provided a computer readable medium containing computer-executable instructions which, when performed by a processor in a computer system for data interpretation, cause the computer system to create interpretations of at least one original document of raw application data. The computer-executable instructions are organized as a cascade of reusable platform-independent software components where each component in the cascade causes the processor to receive a document as input, apply an eXtensible Stylesheet Language stylesheet to the document and produce an output document.

In accordance with a further aspect of the present invention there is provided a computer system for data interpretation. The computer system includes a processor operable to perform computer-executable instructions to create interpretations of an original document of raw application data. The computer-executable instructions are organized as a cascade of reusable platform-independent software components, where each component in the cascade cause the processor to receive a document as input, apply an eXtensible Stylesheet Language stylesheet to the document and produce an output document.

In accordance with a further aspect of the present invention there is provided a method of creating an interpretation of an original document of raw application data. The method includes, at an instance of a first reusable platform-independent software component in a plurality of reusable platform-independent software components arranged in a cascade: receiving the original document; applying an eXtensible Stylesheet Language stylesheet to the original document; and producing an output document. The method further includes, at an instance of a subsequent reusable platform-independent software component in the cascade: receiving an interim document output from a previous reusable platform-independent software component as input; applying an eXtensible Stylesheet Language stylesheet to the interim document; and producing a further output document. The method also includes, at an instance of a last reusable platform-independent software component in the cascade: receiving a final interim document output from a penultimate reusable platform-independent software component as input; applying an eXtensible Stylesheet Language stylesheet to the final interim document; and producing the interpretation.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 4 illustrates an exemplary XSLT stylesheet for use according to an embodiment of the present invention; and FIGS. 5A-5F illustrate source code for an exemplary JavaBean, a transformer object of which may apply the stylesheet of FIG. 4 according to an embodiment of the present invention.

DETAILED DESCRIPTION

The Java™ programming language is a programming language designed for use in distributed environments such as the Internet. Java enforces an object-oriented programming model and can be used to create complete applications that may run on a single computer or be distributed among servers and clients in a network.

The increasing adaptation of Java to various computing tasks may be attributed to the portability of the language and the fact that Java is an object-oriented programming language. Portability is a name given to the characteristic of Java that allows a source program to be compiled into "bytecode" that can be run anywhere in a network on a server or client that has a Java "Virtual Machine". It is then the task of the Java Virtual Machine to interpret the bytecode into code that will run on the computer hardware that is running the Java Virtual Machine. The object-oriented characteristic of Java allows a given object to take advantage of being part of a class of objects and to inherit code that is common to the class. Objects have associated methods. A method can be thought of as one of a set of capabilities or behaviors of a given object. A "component" is a reusable platform-independent software component that can be combined with other components in the same or other computers in a distributed network to form an application. Examples of a component include: a single button in a graphical user interface, a small interest calculator, an interface to a database manager. Components can be deployed on different servers in a network and communicate with each other for needed services. A component runs within a context called a container. Examples of containers include pages on a Web site, Web browsers and word processors. In its JavaBeans™ application program interface for writing a component, Sun Microsystems calls a component a "Bean". A JavaBean, which is a special type of a Java class, is simply the Sun Microsystems variation on the idea of a component.

Another component model is called an "Enterprise" JavaBean. Enterprise JavaBeans™ have qualities such as security, persistence, transaction capability, multithreading and scalability, among others. Hence, Enterprise JavaBeans have found extensive use in e-commerce applications where such qualities are particularly desirable.

Figure 1:
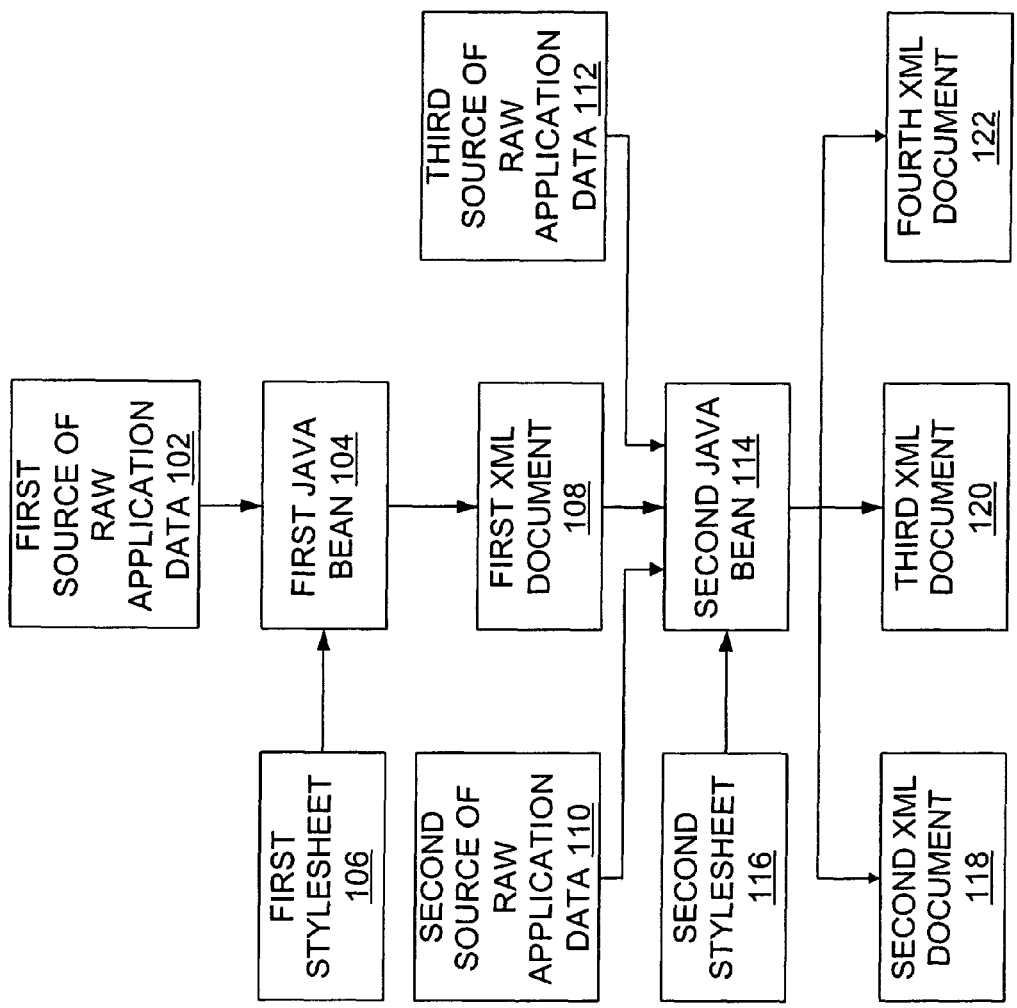
FIG. 1 illustrates an exemplary two-link chain of cascaded JavaBeans according to an embodiment of the present invention.

FIG. 1 illustrates an exemplary two-link chain of cascaded JavaBeans for processing XML documents. A first JavaBean 104 receives input from a first source of raw application data 102. A first stylesheet 106 is made available to the first JavaBean 104 for processing XML documents that are received as input from the first source of raw application data 102. A result of this processing is a first XML document 108. This first XML document 108 is received as input to a second JavaBean 114, along with multiple XML documents received from a second source of raw application data 110 and a third source of raw application data 112. A second stylesheet 116 is employed by the second JavaBean 114 to process the received XML documents. Some results of this processing by the second JavaBean 114 are shown as a second XML document 118, a third XML document 120 and a fourth XML document 122.

As will be apparent to a person skilled in the art, it is not entirely accurate to say that a JavaBean "processes" a document. A JavaBean contains a transformer object, which is an instance of a special Java class that is capable of processing XML documents. It is this transformer object that employs the stylesheet specified in the JavaBean and processes XML documents. The transformer object applies all the rules specified in the stylesheet on the XML document to produce a new XML document as output.

The following is a very short example of the format of an XSLT stylesheet:

```
<?xml version="1.0"?>
<xsl:stylesheet version="1.0"
xmlns:xsl="http://www.w3.org/1999/XSL/Transform">
    <xsl:template match="/">
    <xsl:apply-templates/>
    </xsl:template>
    <xsl:template match="city">
    - - - - - city matching processing here - - - - - - - - -
    </xsl:template>
    <xsl:template match="transaction">
    - - - - - transaction matching processing here - - - - - - - - -
    </xsl:template>
    - - - - - further processing here - - - - - - -
</xsl:stylesheet>
```

The above exemplary stylesheet was written by a programmer that knew that the document to be transformed contains elements named "city". Each time an instance of a transformer object controlled by this exemplary stylesheet encounters such an element, the instance will perform something specific to that element. Evidently, the document to be transformed also contains elements named "transaction". Each time the instance encounters one of those elements, the instance performs whatever processing is specified in the XSL template specific to that element.

Figure 3:
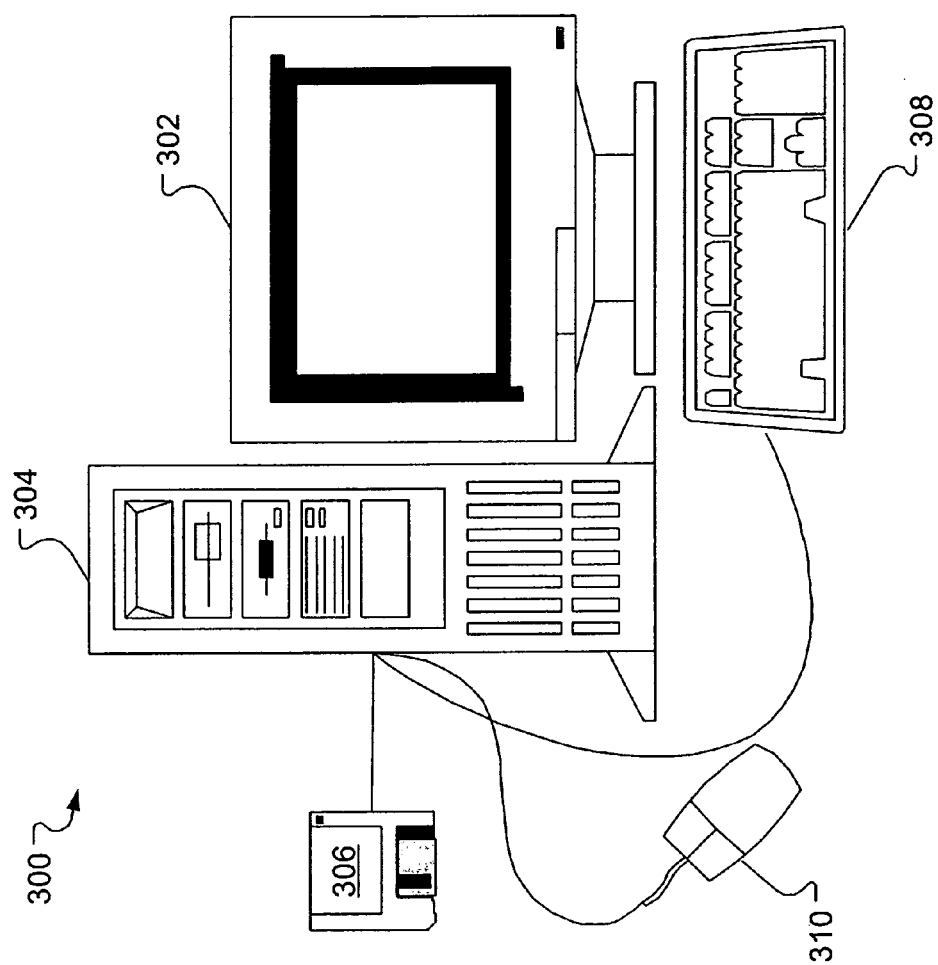
FIG. 3 illustrates a data interpretation system, capable of executing methods exemplary of the present invention.
Figure 5A:

A data interpretation system 300, capable of executing methods exemplary of the present invention, is illustrated in FIG. 3. The data interpretation system 300 includes a display monitor 302 and a central processing unit 304. The central processing unit 304 may include hardware to network with other computers, long term and short term memory and a processor. As is typical, connected to the central processing unit 304 may be multiple input peripherals such as a keyboard 308 and a mouse 310. The database system 300 may be loaded with a database management system for executing methods exemplary of this invention from a software medium 306 which could be a disk, a tape, a chip or a random access memory containing a file downloaded from a remote source.

In overview, a transformation process is applied to XML documents of raw application data, organized according to a first data model, to result in XML documents that use a second data model. At the heart of this XSLT-based transformation process is a chain of cascaded JavaBeans, each of which takes in one or more input XML documents, applies a stylesheet to the input XML documents to give a transformed result and outputs one copy of the transformed result to each downstream caller requesting a transformed result. A downstream caller, in this context, is a further JavaBean that has indicated a requirement for the transformed result. With each transformation in this cascade, data may be extracted (from multiple sources, in some cases), interpreted, analyzed and gradually converted to the format expected by the JavaBeans at the end of the chain. Each JavaBean can, at any point, serialize and save the document contained by the JavaBean.

JavaBeans involved in this cascaded chain need not be arranged to have any awareness of the structure of the data being transformed and passed down the chain. All the logic and knowledge of data content can be kept in the stylesheet that is used by the transformer object to perform the transformation. That is, a programmer writes a stylesheet that is specific to the XML document that is to be received and transformed. Helper methods and reusable filters, aggregators and interpreters (discussed hereinafter) can add additional value. This makes the cascade easily configurable, scalable and reusable. With this multi-layering approach, as much as or as little of the document received at one level may be exposed to the document requesters (JavaBeans) on the next level down the cascade. Note that "multi-layering" is another term for this cascading.

This control over the exposure of a given document to a subsequent level may be accomplished using a number of strategies. One such strategy is element filtering combined with authentication and authorization. In element filtering, only previously selected elements of a received XML document are made available to a subsequent transformer object under control of an XSLT stylesheet. An example follows that makes extensive use of element filtering. Element filtering can be achieved by applying security measures that restrict use of the document interface of a given JavaBean to some downstream callers but still allow other downstream callers to receive the entire content. Enterprise JavaBeans are a special subset of JavaBeans that can be utilized to apply such security measures.

Where an XML document received by a given Enterprise JavaBean contains sensitive data (e.g., employees' salaries) among other data, not everyone should be allowed to see this sensitive data. An appropriately configured Enterprise JavaBean and XSLT stylesheet combination may, for instance, allow a manager to extract all required elements from the XML document without restrictions. However, through security measures that can be imposed, regular (i.e., non-managerial) users may only extract non-sensitive data.

One advantage of breaking down the transformation process into several steps is performance enhancement. By using the first steps for filtering and extracting data, the size of the incoming document can be reduced significantly before more complex processing starts taking place.

Another advantageous feature in this design is that the state of each document may be maintained at every step in the transformation chain. Such maintenance may eliminate redundant processing. Documents in the intermediate states may be directly used in more than one subsequent transformation, without having to redo all the steps that led to that state. Thus, where two transformations that require similar initial processing are implemented as cascades of intermediate transformations, the same JavaBeans may perform the initial processing on the same data set. Where steps of the two transformations begin to differ, the common output of the initial processing stage may be passed to two separate cascades of JavaBeans.

That is, a linear cascade of JavaBeans may be bifurcated where common processing for two leaf node components (JavaBeans) in said cascade is accomplished upstream of the bifurcation.

Figure 2:
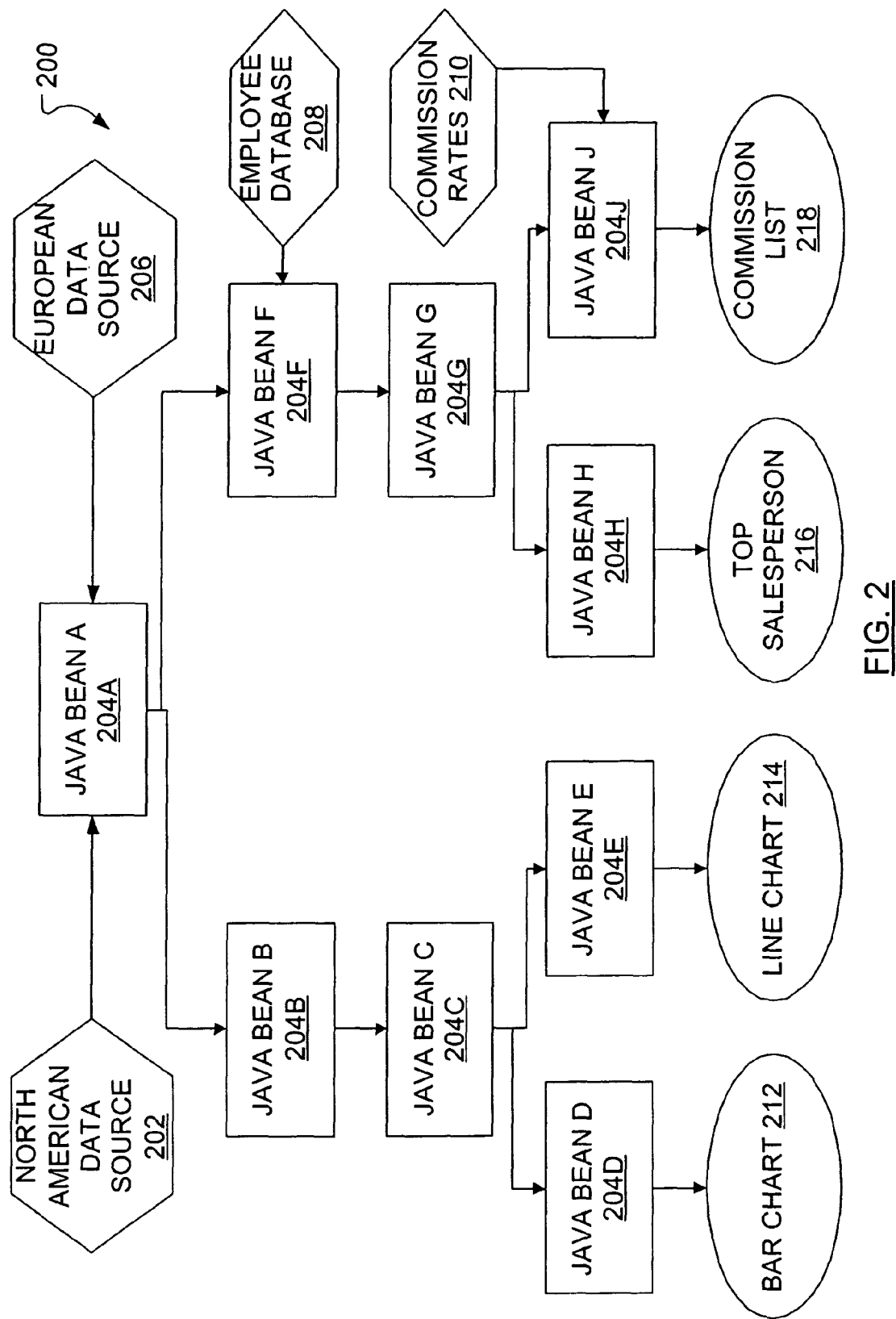
FIG. 2 illustrates a cascade of JavaBeans for use in describing an example embodiment of the present invention.

Consider the following example in view of FIG. 2.

The head office of an international corporation receives sales reports from a North American office and a European office. The sales reports are formatted as XML documents and each XML document contains hundreds of thousands of XML elements. Each XML element in each XML document (sales report) represents a transaction and contains the following information: transaction number, salesperson ID, product ID, quantity, unit price, city, country and date of transaction.

Four different users have interest in different subsets of information from this common input data. User 1 wants a bar chart showing the total sales per month in Toronto. User 2 wants a line chart showing the same data that user 1 wants. User 3 wants the name of the top salesperson in Canada. User 4 is the accountant for the company and wants to calculate the commission for each Canadian salesperson.

The task of converting one XML data set to another XML data set can be accomplished through the use of XSLT (XSL Transformations). However, in this case, with huge XML documents as input, performance problems are very likely to arise if a single XSLT processor is required to perform a single transformation and output the desired results. These performance problems stem from the fact that the XSLT processor typically holds all the data in memory as a tree structure during the transformation. This tree structure may require as much as ten times the memory required by the original data. Although the computations required by the various users seem relatively straightforward, the computations require sorting, looping, merging and other processes, which can be very time-consuming when performed on data structures of large magnitude.

This present invention contemplates an XSLT-based transformation process broken down into several steps, with each step being performed by a JavaBean. Each JavaBean receives one or more XML documents as input, applies an XSLT stylesheet to this input and may pass a copy of the output to a caller immediately downstream in the cascade of JavaBeans. As discussed hereinbefore, the XSLT stylesheets are developed by a programmer. Thus, is the task of the programmer to break down the transformation process.

The efficiency of this process lies in the manner in which the transformation process is broken down. For an efficient transformation, it is preferable that the first steps are used to reduce the size of the incoming XML document as much as possible, thereby minimizing the amount of time and memory space required by transformations downstream that perform sorting, looping, complex computations, etc. Another factor for the efficiency of the process is to arrange that the intermediate XML documents (i.e., the output of intermediate JavaBeans) can be used by as many downstream JavaBeans as possible, thereby eliminating redundant processing.

FIG. 2 illustrates a unidirectional cascade 200 of JavaBeans arranged to efficiently transform the sales report data into the information required by each of the users.

For a JavaBean A 204 A, the first JavaBean in the cascade 200, the task may be identified generally as the reduction of the XML document size by as much as possible before passing the result down the cascade 200. The JavaBean A 204A receives huge documents from two data sources, a European data source 206 and a North American data source 202. When the kind of data in which the four users are interested is considered, it is clear that the best way to reduce the size of the XML document is to select only the XML elements that represent Canadian transactions. Also, as mentioned above, each element contains the following information: transaction number, salesperson ID, product ID, quantity, unit price, city, country and date of transaction. Some of this information is not required for subsequent transformations. For example, transaction number and product ID will not be used in any computation. The "country" information is not needed either, since all entries in the resulting XML document represent Canadian transactions.

A programmer with the information about what will be required by the users and the structure of the source data sets writes an XSLT stylesheet to be used by the JavaBean A 204A. In fact, the programmer writes an XSLT stylesheet to be used by each of the JavaBeans in the cascade 200. The XSLT stylesheets are not shown in FIG. 2 but should be understood to be used by each of the JavaBeans to perform transformations.

Where the filtering performed by the JavaBean A 204A has been properly configured, the resulting XML document, which is received by a JavaBean B 204B and a JavaBean F 204F, contains the minimum amount of common data that the JavaBean B 204B and the JavaBean F 204F require for further processing.

The JavaBean B 204B reduces the size of the XML document received from the JavaBean a 204A to suit the needs of users 1 and 2 only. In particular, the JavaBean B 204B, as controlled by a corresponding XSLT stylesheet, retains only XML elements for which the city is identified as Toronto and discards the rest. The size of each individual element is further reduced by the JavaBean B 204B through a filtering out of the salesperson ID, since the salesperson ID is not necessary for the transformations downstream. The JavaBean B 204B also filters out the city information, since all the entries in the resulting XML document represent transactions made in Toronto. Since users 1 and 2 are only interested in the month when the transaction was made, the XSLT stylesheet used by this JavaBean extracts the month information from the date of purchase and discards the rest.

The XML document output from JavaBean B 204B is made up of XML elements, where each XML element represents a transaction made in Toronto and contains an indication of the month in which transaction took place in addition to a description of the transaction in terms of a quantity of a product and the unit price of the product.

The subsequent JavaBean to the JavaBean B 204B is a JavaBean C 204C. the JavaBean C 204C receives the XML document output from the JavaBean B 204B. The XSLT stylesheet (not shown) associated with the JavaBean C 204C causes the JavaBean C 204C to loop through all the XML elements, group the XML elements based on the "month" information and compute a total revenue for each month. The output of the JavaBean C 204C is an XML document with 12 XML elements, each XML element representing a month and the associated total sales for that month. The JavaBean C 204C passes this XML document to a JavaBean D 204D and a JavaBean E 204E.

The JavaBean D 204D receives the output of the JavaBean C 204C and, based on instructions in the corresponding XSLT stylesheet, uses the information in the XML document to draw a bar chart 212 showing total sales by month. The JavaBean E 204E receives the output of the JavaBean C 204C and, based on instructions in the corresponding XSLT stylesheet, uses the information in the XML document to draw a line chart 214 showing total sales by month.

It is important to note that user 1 and user 2 required the exact same information from the original document, but required the information to be displayed differently. Clearly, it would have been wasteful to perform the transformations associated with the JavaBean A 204A, the JavaBean B 204B and the JavaBean C 204C twice. These JavaBeans were cascaded such each result of the first three transformations may, if necessary, be used in more than one subsequent transformation. As the only difference in requirements of user 1 and user 2 was at the last step, a fork in the cascade was formed. Such an elimination of redundant processing may be seen to greatly improve performance.

Notably, although the above transformation was presented as processing from the top of the cascade 200 to the bottom. In operation, the process begins when the user 1 requests a bar chart showing total sales by month. The JavaBean D 204D receives the request and formulates a request subsequently sent to the JavaBean C 204C. The request need only request the output of the JavaBean C 204C since the XSLT stylesheet that leads to the output is static and predetermined by the programmer. The JavaBean C 204C then formulates a request subsequently sent to the JavaBean B 204B. The JavaBean B 204B, in turn, formulates a request subsequently sent to the JavaBean A 204A. Upon receiving the request from the JavaBean B 204B, JavaBean A 204A performs a transformation on the input data and the cascade of transformations described hereinbefore occurs.

User 3 and user 4 are interested in the top Canadian salesperson and the commission for each salesperson, respectively. Therefore, when a JavaBean F 204F uses instructions received in a corresponding XSLT stylesheet to process the XML document received from the JavaBean A 204A, the number of XML elements is maintained, as all XML elements relate to Canadian transactions. However, the JavaBean F 204F reduces the size of the received XML document by removing all unnecessary information from each XML element. For each XML element (representative of a single transaction) in the XML document, the JavaBean F 204F keeps only the salesperson ID, the quantity of the product and the unit price of the product.

At a JavaBean G 204G, the output XML document is received from the JavaBean F 204F. The transformation performed by the JavaBean F 204F, according to instructions in the corresponding XSLT stylesheet, involves the computation of a total sales figure for each salesperson. The JavaBean F 204F receives further input from an employee database 208, which allows the matching of a salesperson name to a corresponding salesperson ID. Note that the information received from the employee database 208 may not arrive in the form of an XML formatted document. The matching name information is used by the JavaBean G 204G to augment the XML elements in the resulting XML document that is passed down to a JavaBean H 204H and a JavaBean J 204J. That is, the XML elements include a salesperson name and a total sales figure.

At the JavaBean H 204H, under control of a corresponding XSLT stylesheet, the XML elements in the XML document output from the JavaBean G 204G are ranked according to the total sales and an XML document output from the JavaBean H 204H indicates the name of the salesperson 216 with the highest total sales.

The JavaBean J 204J uses an additional data source, namely, a source of commission rates 210, to associate a commission rate with each of the salespeople whose name appears in the XML document received from the JavaBean G 204G. The XSLT stylesheet associated with the JavaBean J 204J provides instructions to the JavaBean J 204J that are used to calculate a total commission for each of the salespeople. The resulting XML document output from the JavaBean J 204J is a list 218 wherein each XML element includes an identification, by name, of a salesperson and an associated total commission.

The example above, albeit simple, shows key concepts which assist in overcoming performance limitations associated with performing standard XSL transformations on large documents. By breaking down the transformation, and creating reusable intermediate documents, many smaller transformations may be performed efficiently and in parallel. Such an approach is efficient because it minimizes redundant processing and reduces the size of the document to a minimum before any time and memory-consuming processing.

As discussed hereinbefore, helper methods and reusable filters, aggregators and interpreters can add additional value.

Helper methods may be employed where it is required to invoke code written in another language (e.g., Java) from the stylesheet. This may be necessary:

- when it is required to access data held externally (e.g., in a database);
- when it is required to perform a complex calculation that would be difficult to express in XSLT, for example, string manipulation; or
- when it is required to access system services not directly available in XSLT, such as trigonometric functions, random number generators, determining the current date/time, etc.

Aggregators are Java classes used to compile results from different transformations and provide fast results to the JavaBeans in the cascade. Suppose, a transformation returns a document containing the total sales of each salesperson on a given day. An aggregator may be used to compile results for a particular time period (weekly/monthly) and return the results to a JavaBean in the cascade if the JavaBean asks for the results.

Interpreters are Java classes used to interpret data. For example, if the total sales is $1,000,000. What does that mean exactly? Is that good or bad? Were expectations met? A traffic signal widget may be implemented that displays red if the total sales is way below expected, yellow if we just missed our target, and green if we exceeded the target. The traffic signal widget may require an "interpreter" Java class. The interpreter Java class receives the total sales and contains all the information needed to return the green/red/yellow color.

Advantageously, the cascaded JavaBeans may be identical and generic enough to be easily adaptable to change. In the above example, if user 1 changes his mind and wants a pie chart instead of a bar chart, the JavaBean D 204D does not need to be changed or re-compiled. Instead, the XSLT stylesheet that the JavaBean D 204D uses to produce the bar chart is exchanged for an XSLT stylesheet that may be used by the JavaBean D 204D to produce a pie chart.

One manner in which the XSLT stylesheet may be exchanged may be understood through a review of the following example. As will be apparent to a person skilled in the art, there exist other ways for exchanging the XSLT stylesheet supplied to a JavaBean.

Assuming, initially, that the end user wants to look at a set of data of interest in the form of a bar chart in a web browser. A web designer would write a JSP (a Java Server Page, which is an Hyper-Text Markup Language page that can include and run Java code). The web designer initially lays out the components (e.g., buttons, banners, graph, etc.) in the JSP. In the JSP, he would also initialize a chart-drawing JavaBean necessary to display the latest data, i.e., the JavaBean that would return a Scalable Vector Graphics (SVG) chart to be displayed in the browser. The web designer also arranges that, when the chart-drawing JavaBean is initialized, the name of the stylesheet to be used is passed to the chart-drawing JavaBean. With knowledge of the fact that the end user wants to display the data in a bar chart, the web designer might arrange that the name of a stylesheet named "barchart.xsl" be passed to the chart-drawing JavaBean. When the user refreshes the page to get the latest data, the chart-drawing JavaBean in the JSP calls an upstream JavaBean to get the latest data and this call starts a chain reaction of calls to JavaBeans higher in the cascade. When the result makes its way down the cascade and reaches the chart-drawing JavaBean in the JSP, the transformer object of the chart-drawing JavaBean receives "barchart.xsl" and the incoming XML document. The transformer object applies all the rules in the stylesheet to the data in the incoming XML document and produces an SVG bar chart which is then displayed by the browser.

If the web designer included, on the JSP, a button that the user can use to switch between a bar chart and a pie chart, then when the user clicks the button:

- The JavaBean is passed the name of an alternate stylesheet, perhaps called "piechart.xsl".
- The chart-drawing JavaBean is asked to perform another transformation. This time, the transformer object of the chart-drawing JavaBean receives the piechart.xsl stylesheet along with the most recently received XML document.
- The transformer object applies all the rules in the piechart.xsl stylesheet to the data in the received XML document and produces a pie chart which is then displayed by the browser.

The web designer could include, on the JSP, a button to toggle between two JavaBeans. In such a case, two chart-drawing JavaBeans are initialized in the JSP. When the user clicks the button the first time, a first chart-drawing JavaBean, which has been passed the name of "barchart.xsl", is directly invoked. If the user clicks on the button one more time, the second chart-drawing JavaBean, which uses "piechart.xsl", is directly invoked.

An exemplary XSLT stylesheet 400 is shown in FIG. 4. FIGS. 5A-5F illustrate source code for an exemplary JavaBean, a transformer object of which may apply the XSLT stylesheet 400 of FIG. 4 to a received XML document.

The cascaded JavaBeans are not necessarily identical. JavaBeans with specific properties, such as the security features provided by Enterprise JavaBeans, may be used where necessary. However, each JavaBean has in common the use of an XSLT stylesheet to control the processing.

In review, a cascade of JavaBeans (and associated stylesheets) is used to break down a process of performing a transformation on an XML document, where the output from one JavaBean is the input for one or more downstream JavaBeans. In early stages of such a cascade of JavaBeans, element filtering may be used to reduce the size of the XML document as much as possible before computations, searches, etc. are started. Advantageously, each JavaBean in the cascade can serialize (i.e., save to disk) the document it outputs, so that the output document can be accessed and used at any time without having to redo any work. Security measures can be used so that a given JavaBean exposes as much or as little of an output document as needed, depending on the role of the user. Each intermediate JavaBean in the cascade can augment the data received with data from other sources (e.g., a database, an XML document from more than one upstream JavaBean). A given JavaBean in the cascade may use aggregators, to compile results from different transformations, and interpreters, to give the raw output data some context and meaning. Notably, a JavaBean may have no knowledge of the content of the XML document received. The data-specific details are contained in the XSLT stylesheets. This makes the cascade of JavaBeans reusable, scalable and easy to maintain.

Other modifications will be apparent to those skilled in the art and, therefore, the invention is defined in the claims.

We claim:

1. A computer readable medium containing computer-executable instructions which, when performed by a processor in a computer system, cause the computer system to:

retrieve a copy of a document from a data source in response to a first request for a first version of the document from a first user and a second request for a second version of the document from a second user;

process the retrieved copy of the document at an intermediary component disposed between the data source and a first cascade of reusable platform-independent software components that generates the requested first version of the document and a second cascade of reusable platform-independent software components that generates the requested second version of the document, the intermediary component determining unneeded data from the retrieved copy of the document based on the first request and the second request and reducing a size of the retrieved copy of the document by filtering out the determined unneeded data from the retrieved copy of the document before passing the filtered copy of the document to the first cascade of reusable platform-independent software components and to the second cascade of reusable platform-independent software components;

responsive to the intermediary component processing the retrieved copy of the document to generate a filtered copy of the document, process the filtered copy of the document in the first cascade and the second cascade, wherein each component in a cascade receives a set of data from the filtered copy of the document from an upstream component, transforms the set of data by applying a stylesheet to the set of data, and outputs a transformed document to a downstream component in the cascade, wherein the transformations performed at each component in the first cascade progressively converts the copy of the document to the first version of the document requested by the first user and wherein the transformations performed at each component in the second cascade progressively converts the copy of the document to the second version of the document requested by the second user, wherein common processing for a component in the first cascade and a component in the second cascade is performed upstream of a bifurcation between the components, and wherein the first cascade and the second cascade merge back into one cascade at a point where a component in both the first cascade and in the second cascade request an identical set of data from an upstream component such that the upstream component needs only output the identical set of data once; and output the requested first version of the document to the first user and the requested second version of the document to the second user.

2. The computer readable medium of claim 1 wherein the intermediary component determines whether to retrieve at least one additional document and combine the at least one additional document with the retrieved document based on the first request from the first user and the second request from the second user.

3. The computer readable medium of claim 2 wherein each component in a cascade requests from an upstream component a set of data from the document, receives the requested set of data from the upstream component, processes the received requested set of data by applying a stylesheet to the received requested set of data and passes the processed received requested set of data to a downstream component in response to a request for the processed received requested set of data from the downstream component.

4. The computer readable medium of claim 1 wherein security measures are implemented, said security measures specifying, based on a role of a user, an amount of a requested set of data to which said user may be exposed.

5. The computer readable medium of claim 1 wherein said stylesheet comprises an eXtensible Stylesheet Language (XSL) stylesheet used as an XSL Transformations (XSL T) stylesheet.

6. The computer readable medium of claim 5 wherein at least one component serializes a generated output.

7. The computer readable medium of claim 6 wherein at least one component uses an aggregator to compile results from different transformations.

8. The computer readable medium of claim 7 wherein at least one component uses an interpreter to give context and meaning to a subset of data provided to a user.

9. The computer readable medium of claim 1, wherein the first version of the document comprises identical information from the document as the second version of the document, and wherein the first version of the document comprises a different display of the identical information than the second version of the document.

10. A computer system for data interpretation comprising:

a processor operable to perform computer-executable instructions to retrieve a copy of a document from a data source in response to a first request for a first version of the document from a first user and a second request for a second version of the document from a second user;

process the retrieved copy of the document at an intermediary component disposed between the data source and a first cascade of reusable platform-independent software components that generates the requested first version of the document and a second cascade of reusable platform-independent software components that generates the requested second version of the document, the intermediary component determining unneeded data from the retrieved copy of the document based on the first request and the second request and reducing a size of the retrieved copy of the document by filtering out the determined unneeded data from the retrieved copy of the document before passing the filtered copy of the document to the first cascade of reusable platform-independent software components and to the second cascade of reusable platform-independent software components responsive to the intermediary component processing the retrieved copy of the document to generate a filtered copy of the document, process the filtered copy of the document in the first cascade and the second cascade, wherein each component in a cascade receives a set of data from the filtered copy of the document from an upstream component, transforms the set of data by applying a stylesheet to the set of data, and outputs a transformed document to a downstream component in the cascade, wherein the transformations performed at each component in the first cascade progressively converts the copy of the document to the first version of the document requested by the first user and wherein the transformations performed at each component in the second cascade progressively converts the copy of the document to the second version of the document requested by the second user, wherein common processing for a component in the first cascade and a component in the second cascade is performed upstream of a bifurcation between the components, and wherein the first cascade and the second cascade merge back into one cascade at a point where a component in both the first cascade and in the second cascade request an identical set of data from an upstream component such that the upstream component needs only output the identical set of data once; and output the requested first version of the document to the first user and the requested second version of the document to the second user.

11. The computer system of claim 10 wherein the intermediary component determines whether to retrieve at least one additional document and combine the at least one additional document with the retrieved document based on the first request from the first user and the second request from the second user.

12. The computer system of claim 11 wherein each component in a cascade requests from an upstream component a set of data from the document, receives the requested set of data from the upstream component, processes the received requested set of data by applying a stylesheet to the received requested set of data and passes the processed received requested set of data to a downstream component in response to a request for the processed received requested set of data from the downstream component.

13. The computer system of claim 10 wherein security measures are implemented, said security measures specifying, based on a role of a user, an amount of a requested set of data to which said user may be exposed.

14. A method for processing at least one original document of raw application data, comprising:

retrieving a copy of a document from a data source in response to a first request for a first version of the document from a first user and a second request for a second version of the document from a second user;

processing the retrieved copy of the document at an intermediary component disposed between the data source and a first cascade of reusable platform-independent software components that generates the requested first version of the document and a second cascade of reusable platform-independent software components that generates the requested second version of the document, the intermediary component determining unneeded data from the retrieved copy of the document based on the first request and the second request and reducing a size of the retrieved copy of the document by filtering out the determined unneeded data from the retrieved copy of the document before passing the filtered copy of the document to the first cascade of reusable platform-independent software components and to the second cascade of reusable platform-independent software components responsive to the intermediary component processing the retrieved copy of the document to generate a filtered copy of the document, processing the filtered copy of the document in the first cascade and the second cascade, wherein each component in a cascade receives a set of data from the filtered copy of the document from an upstream component, transforms the set of data by applying a stylesheet to the set of data, and outputs a transformed document to a downstream component in the cascade, wherein the transformations performed at each component in the first cascade progressively converts the copy of the document to the first version of the document requested by the first user and wherein the transformations performed at each component in the second cascade progressively converts the copy of the document to the second version of the document requested by the second user, wherein common processing for a component in the first cascade and a component in the second cascade is performed upstream of a bifurcation between the components, and wherein the first cascade and the second cascade merge back into one cascade at a point where a component in both the first cascade and in the second cascade request an identical set of data from an upstream component such that the upstream component needs only output the identical set of data once; and output the requested first version of the document to the first user and the requested second version of the document to the second user.

15. The method of claim 14 wherein the intermediary component determines whether to retrieve at least one additional document and combine the at least one additional document with the retrieved document based on the first request from the first user and the second request from the second user.

16. The method of claim 15 wherein each component in a cascade requests from an upstream component a set of data from the document, receives the requested set of data from the upstream component, processes the received requested set of data by applying a stylesheet to the received requested set of data and passes the processed received requested set of data to a downstream component in response to a request for the processed received requested set of data from the downstream component.

17. The method of claim 14 wherein security measures are implemented, said security measures specifying, based on a role of a user, an amount of a requested set of data to which said user may be exposed.

* * * * *